United States Patent [19]

Hansel

[11] 4,281,534

[45] Aug. 4, 1981

[54] SENSOR FOR MEASURING LEAKAGE

[75] Inventor: William B. Hansel, Media, Pa.

[73] Assignee: Sun Oil Company of Pennsylvania, Philadelphia, Pa.

[21] Appl. No.: 84,242

[22] Filed: Oct. 12, 1979

[51] Int. Cl.³ .................... G01M 3/32; G01F 23/20
[52] U.S. Cl. .................................... 73/49.2; 73/309
[58] Field of Search ............... 73/49.2, 296, 305, 309, 73/319, 322.5, 447, 448, 449

[56] References Cited

U.S. PATENT DOCUMENTS

| 967,378 | 8/1910 | Hillmer | 73/309 |
|---|---|---|---|
| 988,342 | 4/1911 | Hillmer | 73/309 |
| 1,302,350 | 4/1919 | Foster | 73/309 |
| 4,116,062 | 9/1978 | Reip | 73/322.5 X |
| 4,186,591 | 2/1980 | Mooney | 73/49.2 |

Primary Examiner—Gerald Goldberg
Assistant Examiner—Joseph W. Roskos
Attorney, Agent, or Firm—J. Edward Hess; Donald R. Johnson; Paul Lipsitz

[57] ABSTRACT

A sensor for measuring leakage from a liquid containing tank comprises a main body portion suspended from a balance arm or other mass displacement detector and has a liquid holding portion in the main body. The cross-sectional area of the liquid holding portion is essentially equal to the cross-sectional area of the main body portion in contact with the liquid in the tank. This arrangement enables evaporation losses to be compensated.

2 Claims, 8 Drawing Figures

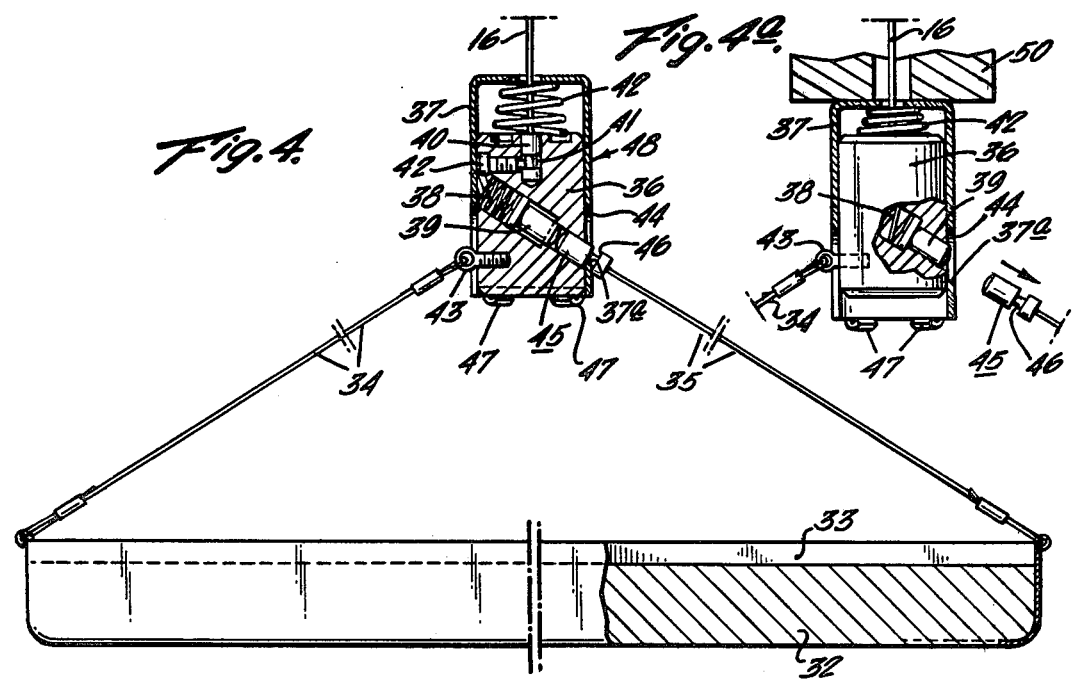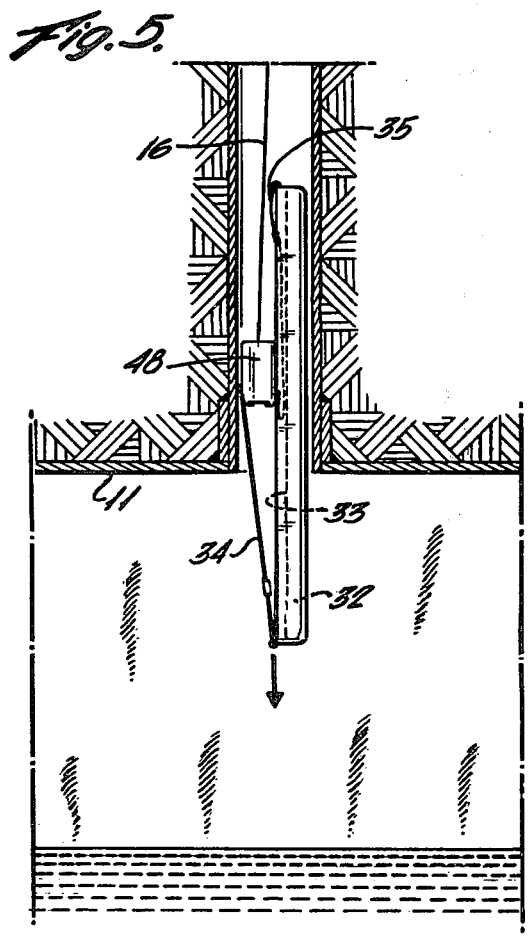

SENSOR FOR MEASURING LEAKAGE

This case is related to Ser. No. 84,241, filed of even date herewith in the names of William B. Hansel and Earl W. Smith.

This invention relates to a sensor used in a highly sensitive method to determine the rate of leakage of liquid from a storage tank, particularly for determining the leakage and rate of leakage of fuel hydrocarbons in installed underground storage tanks.

There are thousands of underground storage tanks at the numerous fuel service stations throughout the world and over a period of time leaks inevitably occur causing fuel hydrocarbons such as gasoline, diesel oil and the like to flow into the ground. Such leaks are, of course, environmental hazards since they could lead to ground water contamination. Also, the leaking fluid can gather in buildings and result in hazardous and toxic hydrocarbon vaporization in the confined air space. Leaks into storage tanks also occur, most often water, which contaminates the tank contents. Thus, it is essential tha such leaks be determined as soon as possible so that corrective measures can be taken. In order that early detection can be made it is essential that the detection method be extremely sensitive (in the range of 0.05 gal. per hour) so as to determine very slight leakage in a relatively short period of time. This is necessary for several reasons including the time value of the test itself, the need to remove the storage tank from dispensing operations for a minimum amount of time, and the like. Heretofore no such suitable method has been available.

It is known in the art to measure the mass of liquid in a storage tank by use of Archimedes Buoyancy Principle using a float in the liquid. However, none of the devices or methods known are adaptable to a highly sensitive, rapid method for leak determination in difficulty accessable storage tanks (e.g. already installed underground tanks). For example, U.S. Pat. No. 967,378 discloses a storage tank fitted with a hydrometer-type weighing device to estimate the weight of liquids stored in the tank. U.S. Pat. No. 988,342 shows a similar device fitted to the storage tank, but where the scale is on the ground for easy access.

The present invention describes a sensor of novel design and describes its use. The sensor is coupled to a sensing device to measure mass displacement over a period of time. As will be further explained, the sensor design is such as to compensate for changes due to vaporization of the liquid. The sensing device is calibrated to determine the amount of liquid per unit of change and after a short period of time, usually only several minutes, the change in mass displacement due to the leak is noted. In this way the rate of liquid loss can be determined by simple calculation.

The sensor device of this invention comprises a main body portion having suspension means for attachment to balance are or other mass displacement detection means and a liquid holding portion in said body, the cross-sectional area of said liquid holding portion being essentially equal to the cross-sectional area of the body portion in contact with the liquid in the tank. It is this specific feature of the liquid holding portion which enables evaporative losses to be compensated.

Reference is now made to the drawings:

FIGS. 3 and 4 are detailed views of preferred sensors.

FIGS. 5 and 6 show the insertion of a preferred sensor into a tank.

Figure 1:
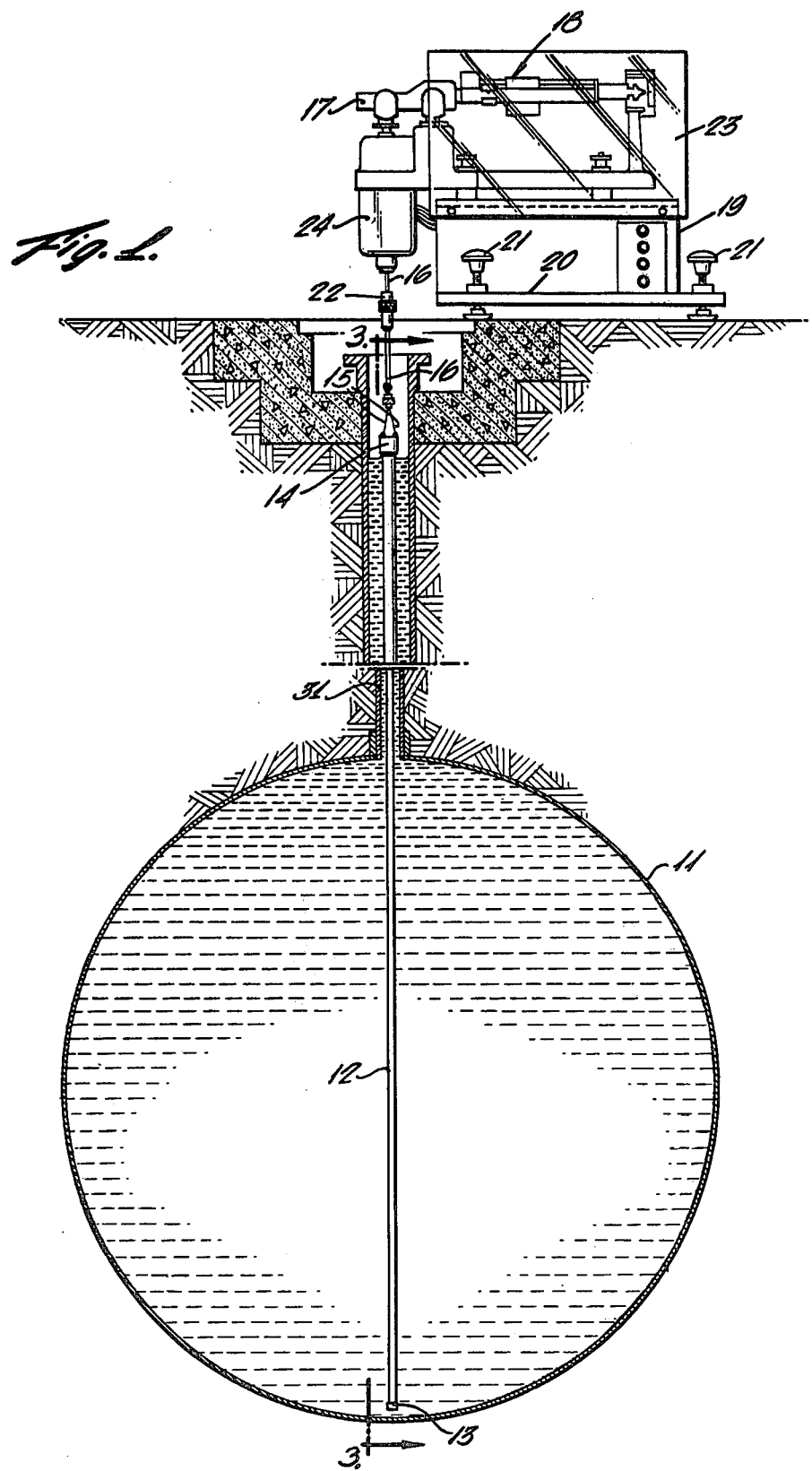
FIG. 1 is a broad overall view of an underground hydrocarbon storage tank with the sensor and detector device in position.

FIG. 1 shows an underground filled hydrocarbon storage tank 11 with the sensor 12 in position in the liquid. The top of the sensor is above the liquid level and the bottom of the sensor is within about 1 to 2 inches from the bottom of the tank. The sensor has a cap 13 and also a cup portion 14 (detailed in FIG. 3) to which supports of wire or string 15 are attached which, in turn, are connected to line 16 which supports the sensor from the weighing arm 17 of a balance shown generally as 18. A coupler 22 may be used for convenience in connecting line 16 to the balance arms. Any change in mass in the tank will result in a liquid level change, which in turn, will result in a change of weight of the sensor. This change of mass detected by the sensor is also sensed by a differential transformer 24 which surrounds the support line 16. The balance 18 may be supported on a box 19 which in turn is supported by a base 20 having leveling screws 21. The box 19 may also contain the desired instrumentation and/or be provided with input and output jacks for connection to appropriate devices which are discussed later. The balance may be shielded from wind by means of a cover 23 as shown.

Figure 2:
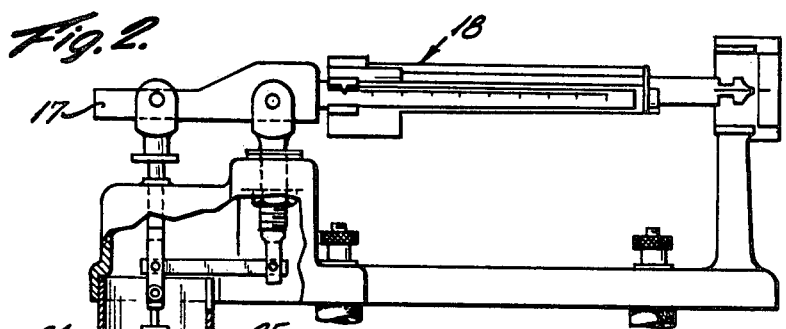
FIG. 2 is a detailed view of the detector system.

Referring now to FIG. 2, line 16 is attached to the balance beam 17 by a detachable coupler 22 and passes through a differential transformer (i.e. a displacement transducer) 24. Attached to line 16 and between the coils of the transducer is a ferromagnetic material 25 whose movement changes the electromagnetic flux of the transducer which is detected by the electronic curcuitry shown at 26 powered by a power supply 27. It will be understood that the transducer need not necessarily be around the line 16, but may be placed in any convenient position, the only requirement being that it is responsive to movement of the balance beam. A suitable transducer is described in U.S. Pat. No. 3,179,193 where it is used in conjunction with a cantelever type support for a fuel tank to weigh fuel removed from the tank and fed to an internal combustion engine. The electronic circuitry 26 will also contain an amplifier to send an amplified signal to a digital readout device 28 which, if desired, may have a strip chart recorder or other printer 29 attached thereto for obtaining a printed record of the measurements.

Figure 3:
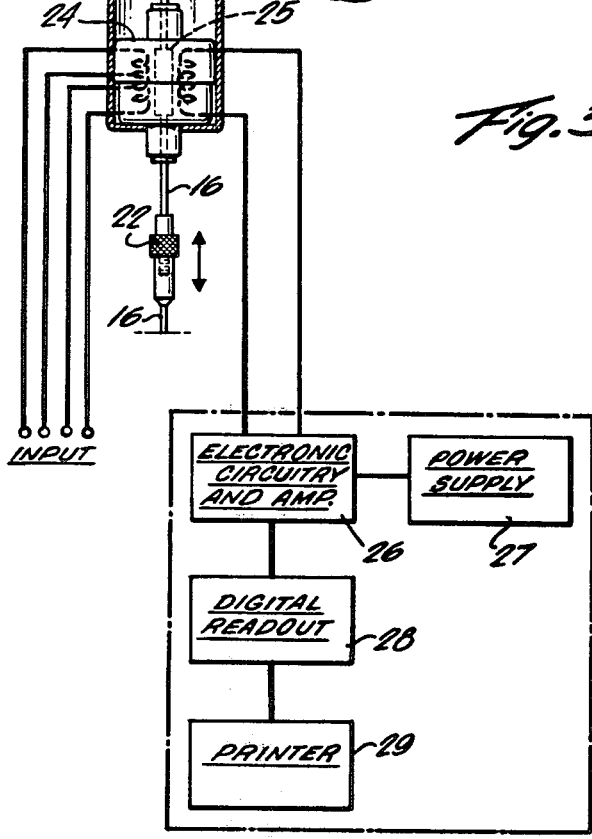

In FIG. 3 which is a section taken on line 3—3 of FIG. 1, the sensor having cap 13 and cup portion 14 is shown in detail. The sensor is filled with liquid from the tank and extends form above the top of the liquid 30 in fill-pipe 31 to just above the bottom of the storage tank 11. As is evident from the drawing the inside diameter of the cup section 14 is essentially equal to the outside diameter of the sensor in order to obtain compensation for evaporation of the hydrocarbon in the tank. The entire sensor system is readily supported by line 16 by appropriate wires or strings 15 through coupling means 22.

Compensation for evaportion results from the fact that when the hydrocarbon is in the cup portion, any evaporation that occurs will occur from both the surface of the liquid in the tank and from the surface of liquid in the cup. The buoyancy of the hydrocarbon liquid on the sensor is a function of the sensor diameter, but since the inside diameter of the cup is essentially the same as the outside diameter of the sensor, the evaporative loss of liquid from the cup will compensate for the buoyancy change due to evaporation of the liquid in the tank. Thus, when the liquid hydrocarbon in the tank evaporates, its buoyant force is reduced and the sensor becomes heavier. But the evaporation of the liquid in the cup reduces the weight of the sensor by exactly the same amount of the buoyant force lost and no change in weight of the sensor accurs. It will be understood of course, that instead of the sensor being tubular (i.e. circular in cross-section) it may be of another configuration and the cup-like section then will be made to have the same cross-section configuration.

By positioning the sensor near the bottom of the storage tank completely filled with liquid and having it extend through essentially the entire height of the liquid in the tank and riser 31 as shown in FIG. 1 the effects of any change in temperature are minimized. This is because the sensor fluid temperature is essentially the same as the tank liquid temperature with the same gradient, if any. As indicated, it is desired that the system measure a change of about 0.05 gallons per hour which is equivalent to about 200 cc per hour. Since the measurements made in accord with the invention are made within a few minutes it is unlikely that there will be a temperature change of more than a fraction of one degree. Tests show that with a tank filled with gasoline using a sensor with a five-eighth inch diameter in a two-inch pipe riser, a one degree(° F.) change effects a change in mass equivalent to about 0.3 cc, which 0.3 cc change represents an insignificant error of 0.15%. Thus, temperature changes are of no significance when the measurements are performed on an essentially full tank and using a sensor extending essentially to the bottom. It will be understood, of course, that where no temperature problems are anticipated, the sensor need not extend to near the bottom of the tank and a shorter sensor may be used. Also, if temperature compensation is not desired, it is not necessary to make the measurement with a full tank of liquid.

In carrying out the leak measuring method with temperature compensation it is desirable to plug off any conduits in the tank system such as risers and the like to reduce the area of such risers in order to maintain sensitivity during leak measurement. After the necessary plugging is done, the balance is erected over the fill-pipe hole, gauge hole or other access hole to the tank, the sensor filled with liquid from the tank and inserted through the hole. The sensor suspension wire is then attached to the beam of the balance. Care must be taken to see that the sensor and its suspension wire do not touch the pipe or tank. The balance is then leveled, and apppropriate electrical corrections made to the power supply, transducer, and recorder. It is also often desirable to cover the balance to protect it against gusts of wind or other interferences. Calibration is then carried out by addding a known amount of liquid to the tank and observing the change in the recording instrument. Observation is then made to the recorder device to note changes. With a strip chart recorder, which is preferred, the pen will trace a straight line if there are no leaks. If a leak is present, the pen will deflect and the angle of deflection is indicative of the leak rate. From the number of divisions on the chart paper that the pen has deflected, the time of the trace, and the deflection per unit of liquid obtained from the calibration step, the leak rate is readily calculated. Also, by starting the pen at the center of the paper and standardzing the direction of deflection, the leak can be determined to be into or out of the tank.

An indicated, it is possible to carry out the measurement with partially filled tanks when temperature compensation is not considered to be critical. In such measurements it is not necessary to plug off the risers and other conduits from the tank and it is preferred to use a different shaped sensor. It will be understood that the sensitivity of the sensor is dependent upon the liquid level in the tank and the shape of the tank. The smaller the area of liquid, the greater the response to change of the sensor. Thus, when the tank is filled with liquid in a riser section, the sensor is most sensitive. At mid-point of a cylindrical tank where the area of liquid level is greater, sensitivity is lowest, and sensitivity will be between these extremes at other positions. Thus, when a partially filled tank is measured, a sensor with a relatively large displacement is desired to increase sensitivity. Also, a more sensitive balance may be used for increased sensitivity.

Figure 7:
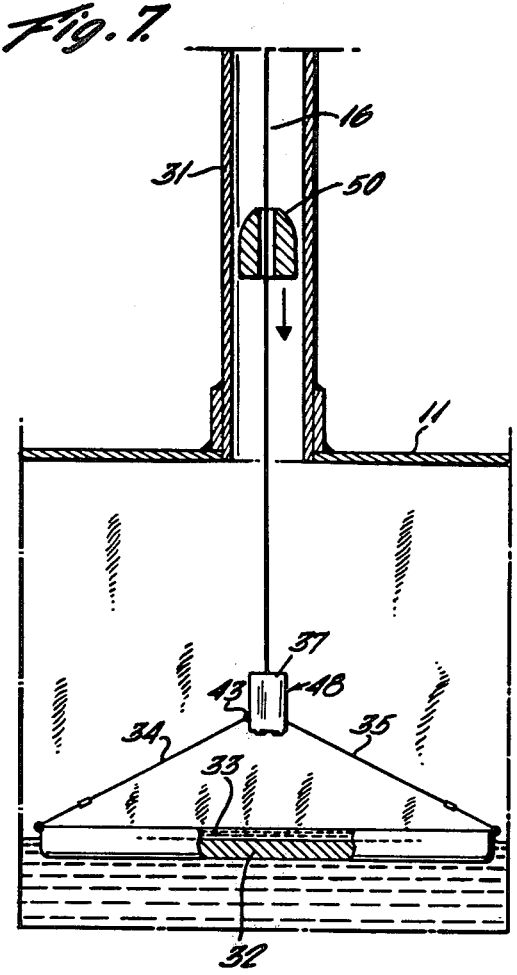
FIGS. 7 and 8 show the removal of a preferred sensor from the tank.
Figure 8:
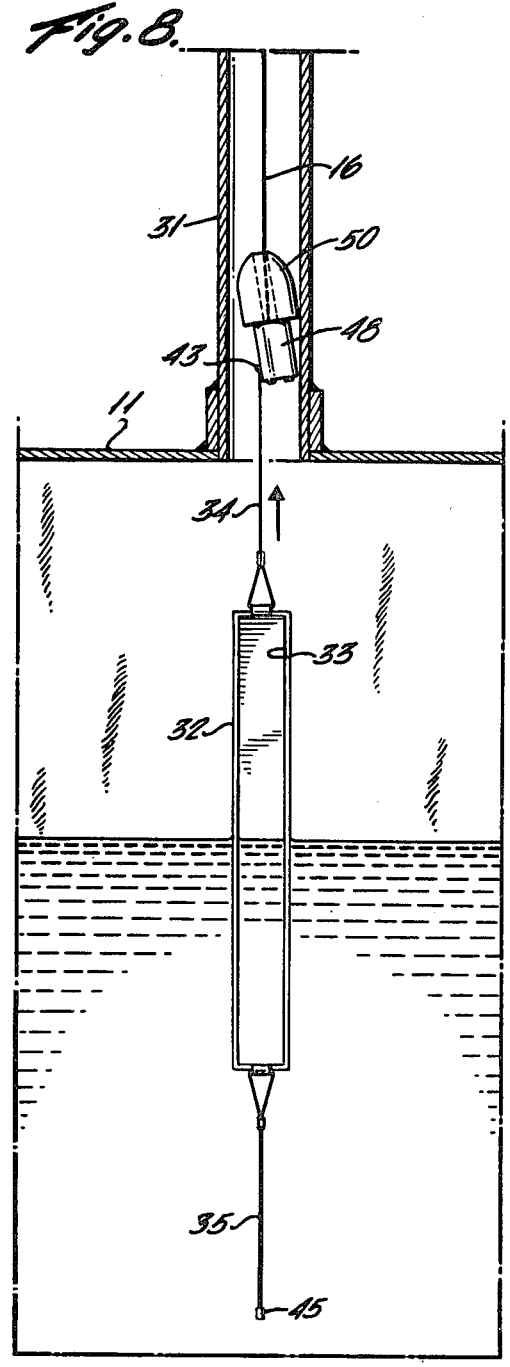

The preferred sensor for less than a full tank system is shown in FIG. 4 and may be in the shape of a flat board 32 with a dished out upper surface 33 and having supporting wires 34 and 35. The board 32 will be sufficiently narrow so as to pass through a pipe into the liquid in the tank. The sensor is suspended on the liquid surface in a horizontal attitude with some liquid in the dished out portion 33 and the cross-sectional area of the liquid in the dished out surface is essentially the same as the cross-sectional area in contact with the liquid in the tank. In this way the compensation for evaporation is accomplished in the same manner as described above. The means by which the narrow sensor is introduced into and removed from the tank is illustrated by FIGS. 4 through 8. The sensor is provided with means to enter the tank and enable it to function in a horizontal position on the surface of the liquid. These means must also enable the sensor to be removed from the tank through the same opening through which it was introduced. Such means shown generally as 48 in FIGS. 4 and 4a embodies a quick release mechanism to enable the sensor to be easily removed. As seen in FIG. 4 a suitable release means comprises a solid cylindrical core member 36 surrounded by an outer cover 37 made of sheet metal, plastic or other suitable material. An angular bore hole in the core member is fitted with a pushing spring 38 and push rod 39. The support line 16 passes through the center top of the outer cover 37 and is fixed to a small cyclindrical fitting 40 with an annular groove 41 which is held in a fixed position within core 36 by a restraining set screw 42. The core also is fitted with a screw eye 43 or other device to which line 34 is attached. A conical spring 42 is positioned between the top of core 36 and outer cover 37. The outer cover is provided with a port 44 in alignment with push rod 39. The edge of the outer cover 37a formed by the port 44 acts as a catch for a pin 45 with an annular groove 46 which is attached to line 35. The port 44 is about twice as long as the diameter of pin 45. Outer cover 37 also may be provided with limiting stubs 47 to hold the assembly together. Before introduction of the sensor into the tank, the pin 45 is inserted through port 44 against push rod 39 and the groove 46 in the pin is positioned at the catch edge 37a of the outer cover. The effect of spring 42 is to hold the outer cover in a fixed position and because of this and spring 38, the pin 45 remains firmly fixed in the catch 37a. The sensor is then placed in the tank through a fill pipe or other access hole as shown in FIG. 5. When it is completely through the pipe the sensor opens as shown in FIG. 6 and after dipping it in the liquid to place liquid in its tray portion it is allowed to rest on the surface of the liquid as shown in FIG. 7. After the determination for leakage is made and it is desired to retrieve the sensor, a weight 50 surrounding line 16 is dropped down the fillpipe 31 onto the quick release system 48. As shown in FIG 4a, the weight impacts upon the outer cover 37 pushing it downward, which in turn removes the catch 37a from groove 46 of pin 45. This causes the cooperating push spring 38 and push rod 39 to push pin 45 outwardly and causes the sensor to take the position shown in FIG. 8. Removal of the sensor is then simply made by pulling it upwardly through the fill-pipe riser 31.

The invention claimed is:

1. A sensor device useful for measuring mass displacement in a leaking tank comprising a main body portion having suspension means for attachment to a balance arm or other means for mass displacement detection and a liquid holding portion in said sensor body to hold liquid above the level of liquid in said tank, the cross-sectional area of said liquid holding portion being essentially equal to the cross-sectional area of the body portion in contact with the liquid in the tank, whereby changes in said mass displacement measurement due to evaporative losses are compensated.

2. A sensor device as in claim 1 having a board-like configuration and designed to be suspended in said tank in a horizontal position, said liquid holding means being a dished out portion in said board-like surface and said suspension means having a quick-release mechanism to enable removal of said sensor through a narrow opening of said tank.

* * * * *